April 6, 1943.     J. ROSS ET AL     2,315,983
METHOD AND APPARATUS FOR FOAM DETERMINATION
Filed March 8, 1941

INVENTORS
JOHN ROSS
BY GILBERT DeWAYNE MILES
Trenton Meredith
ATTORNEY

Patented Apr. 6, 1943

2,315,983

UNITED STATES PATENT OFFICE 2,315,983

METHOD AND APPARATUS FOR FOAM DETERMINATION

John Ross, Manhasset, and Gilbert De Wayne Miles, New York, N. Y., assignors to Colgate-Palmolive-Peet Company, Jersey City, N. J., a corporation of Delaware Application March 8, 1941, Serial No. 382,372

13 Claims. (Cl. 73—51)

The present invention relates to a process for measuring the foaming properties of liquids and, more particularly, to a process for measuring the relative foam stability of liquids characterized by very stable foams, such as solutions of soaps and detergents, and to a novel device for use in such process.

For many years, a method for properly evaluating the foaming properties of various liquids has been sought by those skilled in various arts. In the soap and detergent industries, this problem has proved very difficult of solution because the volume and quality of the foam produced from a given solution of a soap, detergent or other foam-forming material is a function of many complex factors. It will be appreciated by those skilled in the art that the shape of the apparatus in which the foam is made, the means by which the foam is formed, the subsequent history of the solution, and the destructive forces to which the foam is subjected, including mechanical shocks, thermal changes, and other extraneous disturbances, as well as chemical changes within the film surface, are all controlling factors that necessarily enter into any method for evaluating foaming properties.

More than a quarter of a century ago, Stiepel proposed what was essentially a shaking method for determining foaming properties of these materials. This method failed to meet success, partly because of the introduction of the personal equation of the operator, which greatly influenced the results obtained, and partly because the air for foam was limited by the volume of air in the flask and the foam itself acted as a shock absorber, so that successive shakes were progressively less effective. Furthermore, due to this absorption of shock, there was also progressively less violent destruction of foam.

Subsequently, various other methods were employed by studying foaming properties of various liquids, but these methods were primarily intended for materials which gave very unstable foams. Thus, Christmann bubbled air through a column of liquid for comparing the frothing qualities of materials such as cresylic acids for mineral flotation, and his method depended upon the measurement of the volume of foam produced and the rate of its collapse. Preston and Richardson sought to apply this method to soap solutions for measuring the foam power thereof, drawing air down the hollow shaft of a stirrer and throwing it out from the horizontal blades of the stirrer by centrifugal force. The per cent of solution retained by the foam was taken to be the foam power. It was found that methods such as proposed by these and other investigators who followed along the lines suggested by Christmann were not applicable with liquids producing such stable foams as are given by solutions of soaps and detergents. Where these methods depended upon a measurement of the rate of the collapse of foam produced in the liquid, such procedure was obviously impractical in the case of soap or detergent solutions, where a column of bubbles of homogeneous or heterogeneous size when protected from extraneous disturbances, such as variations in pressure or temperature or evaporation, has been found to have a life period measurable in hours or even days.

In attempting to apply the methods of Christmann and others to solutions of soaps and detergents, we have found that foam, made by bubbling air at constant pressure and rate through a soap or detergent solution contained in the bottom of a column protected by a thermostatic jacket and under conditions which greatly reduced or entirely eliminated the major causes of extraneous disturbance, has extremely long life periods. The drainage of such a stable foam was found to bear no direct relationship to the collapse or stability of that foam, and it was found to be necessary to dissociate phenomena of liquid held or drained by a column of foam from any measure of the foam's stability.

Although many suggestions and proposals have been made by various investigators and experimenters in this field over a long period of years, none, so far as we are aware, has provided the art with a satisfactory and successful solution to the problem of measuring the foaming properties of liquids giving highly stable foams, such as soap and detergent solutions. We have provided a method which, it is believed, provides the art with such a solution.

It is an object of the present invention to provide a process for testing the foaming properties of liquids which is free from the disadvantages and difficulties of prior art methods.

It is another object of our invention to provide a process for comparing the foaming properties of liquids, particularly those characterized by relatively stable foams, which process is relatively free of errors, particularly those arising from a personal equation.

It is also an object of the invention to provide a process for obtaining indicia of the foam characteristics of foam-forming materials, including solutions of soaps and other detergents, which is simple and rapid in operation.

The present invention further contemplates the provision of a process for empirically evaluating foam stability of solutions of soaps and other detergents whereby reproducible values for a given solution can be obtained.

It is also within the contemplation of our invention to provide a device for testing the foaming properties of liquids, especially those characterized by very stable foams.

It is a further object of this invention to provide a device for measuring the volume of foam produced and held by soap and detergent solutions under standardized conditions, whereby values can be obtained from which foam stability of such solutions can be empirically evaluated.

Another object of the invention is to provide a foam-measuring device of great simplicity for producing a column of foam in solutions of soaps and other detergents while maintaining standard conditions, whereby reproducible results can be rapidly obtained.

Other objects and advantages of the present invention will be apparent to those skilled in the art from the following description of our invention, taken in conjunction with the accompanying drawing, in which.

Figure 1:
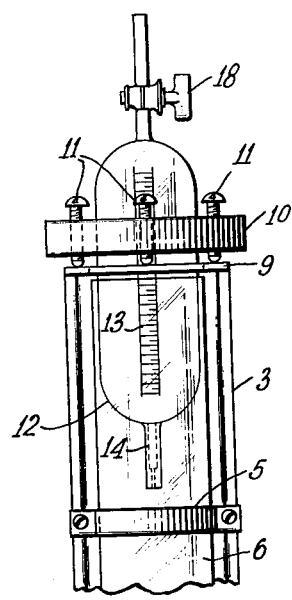
Fig. 1 depicts a fragmentary front elevation of a device according to our invention, partly broken away for greater clarity to show an interior portion thereof in section.
Figure 1:
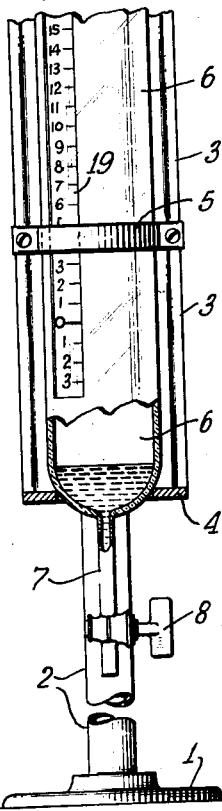

Generally speaking, we have found that measurements of "capacity to form foam" by the prior art are without significance in a relative or comparative sense. Since the volume of foam produced in a hypothetical solution which is capable of giving a foam possessing absolute stability is limited only by the supply of air or gas introduced beneath the surface of the liquid, such solution must be considered to be potentially capable of giving a volume of foam approximately equal to the volume of air bubbled through the solution. With a foam which is not absolutely stable, the final volume of the foam is less than the volume of air introduced by an amount which is a measure of instability of the foam, assuming that no change in bubble size has occurred. From this, we have shown that various materials differ, not in their capacity to foam, as was supposed by the prior art, but rather in the stability of the foam produced. Thus, we have discovered that a method for measuring the stability of a foam towards the particular stress to which it is subjected furnishes a reliable method for measuring foam forming properties. We have accordingly provided a method for producing a foam in a liquid and for controlling the stresses and destructive agents to which it is subjected, and we have further provided an apparatus in which such method can be conveniently carried out, in accordance with the principles of our invention. It will be understood that the foregoing discussion of theoretical principles and considerations is intended as an explanation of our invention, for the benefit of those skilled in this art, and not in limitation of said invention.

Our method is particularly adapted to the measurement of foaming properties in liquids having highly stable foams. Thus, we provide a breakdown stress of sufficient magnitude so that the resulting volume of foam produced is a measure of the relative foam stability of the liquid under test. In other words, we measure the relative stability of a foam by the effect of an arbitrary, standard, destructive mechanism acting upon a foam produced under standard conditions and protected from extraneous and adventitious destructive forces.

Our method comprises establishing a pool of solution to be tested and introducing air beneath the surface of said pool by causing droplets of said solution to fall from a height into the pool. When the droplets strike the surface of the pool, air is carried beneath the surface and foam is produced. The foam thus formed is very wet, and, after a shallow column of foam has been formed, subsequent droplets, falling upon this column, both produce foam therein and destroy foam already produced. Thus, the means of production of foam is in this case also an agent of its destruction. There is thus obtained a simple standardization of the means of production and destruction, since both are functions of the average kinetic energy of the droplets, as they impinge upon the liquid pool and upon the foam.

It will be appreciated that many factors influence the volume of foam which is produced by a given solution. For example, we have found that, with liquids giving foams of high stability, such as solutions of soaps and detergents, the foam production is, within reasonable limits and with other factors equal, practically a straight-line function of the volume of solution introduced into the pool. Similarly, foam production is also, within certain limits, an approximately linear function of the height through which the solution falls. The temperature at which the test is carried out is also a factor in determining the volume of foam produced by a given solution, and, as has been brought out supra, variations in temperature during the test give unreliable results. In this connection, evaporation from the foam must be held at a minimum, and, for this reason, it is preferred that the partial pressure of the solution within the receiving vessel be at the saturation point.

It has been discovered that there is a characteristic relationship for each material between the concentration of that material in the solution and the amount of foam produced. We have found that the foam production increases relatively rapidly with small increments of material at low concentrations, fast approaching an upper limit. With most of the soaps and detergents employed in our tests, further increases in concentration made very little difference in the volume of foam produced. Thus, when introducing 200 cc. of solution into a pool of said solution from a height of 90 cm., tests made at 43° C. upon (a) tallow soap sodium salt in distilled water, (b) olive oil soap sodium salt in distilled water, and (c) a synthetic detergent in distilled water showed little increase in foam production after a concentration of 0.25% was attained. Similarly, the same test run at 60° C. upon (a) sodium palmitate, (b) sodium stearate, and (c) sodium myristate indicated only small changes in foam production for increments in concentration beyond about 0.15%. Sodium laurate under these conditions, on the other hand, gave markedly increased foam production for increases in concentration up to about 0.35%. While we have noted that the volume of foam formed is approximately directly proportional to the height of the fall of the solution introduced, it has been noted that the concentration of material in solution must exceed a certain characteristic minimum for the particular material in order to obtain such linear relationship.

The original depth of the pool into which the solution falls, such as is placed in the bottom of the receiver prior to foam formation, has no appreciable effect upon the total volume of foam produced, provided that the depth of the pool is sufficient so that the amount of air introduced beneath the surface of the pool by droplets falling therein is substantially unaffected.

We have found our results to be remarkably reliable, as compared with results obtained by prior art methods, when the reproducibility of said results is considered. In the cases of solutions where no great variation with age occurs, as in solutions of most of the synthetic detergents, the maximum difference between results has been found to be of the order of about 6 mm. where the foam height is of the order of about 200 mm. The average deviation from the mean has been found to be about 2 mm., a discrepancy of only about 1%. When applied to built soaps in hard water, the maximum deviation has been found to be of the order of about 22 mm. with an average deviation of about 4 mm., or about 2%. This increased deviation in such solutions is probably due more to the difficulty of reproducing such solutions and the effect of ageing upon them than upon any errors introduced into the test method. This supposition is substantiated by the fact that we have found that repeated runs upon the same solution are in closer agreement than are tests upon solutions prepared in parallel. However, those skilled in the art will appreciate that, even with variations of this order, the test is still superior to prior art methods for evaluating soaps, soap builders and the like.

Figure 3:
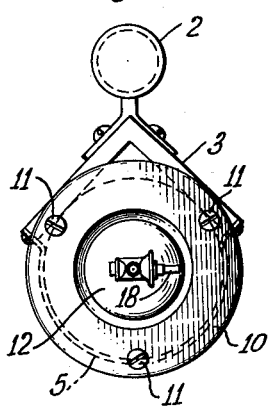
Fig. 3 shows an enlarged top plan view of the device in Fig. 1.

An improved device for carrying out our novel process will now be described for the convenience of those skilled in the art, having particular reference to the accompanying drawing. Referring to Fig. 1, we provide a stand 1 having a vertical rod 2 for maintaining the device in vertical position. A V-shaped wooden support 3 is affixed to the rod and has a shelf 4 and spring bands 5 for holding a cylindrical glass receiver 6 in position. The glass receiver is constricted at the bottom thereof and has an outlet tube 7 equipped with a stopcock 8. At the top of the wooden support 3 and above the mouth of the receiver 6, there is an annular ring 9 adapted to support an annular holder 10 having three leveling screws 11 projecting therethrough for contact with the annular ring (see also Fig. 3). The annular holder is adapted to retain a pipette or reservoir 12 having a graduated volumetric scale 13 thereon. The outside diameter of this pipette is slightly smaller than the inside diameter of the receiver 6, so that it fits quite loosely therein, and it is preferred that the pipette be adapted to hold at least 200 cc. of solution.

Figure 4:
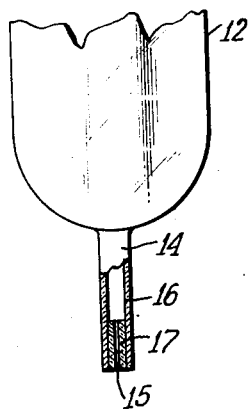
Fig. 4 is an enlarged elevational view of a portion of said device, fragmented and with a part broken away.

The pipette is supplied with an outlet orifice tube 14 of such construction that the turbulence set up therein causes a stream of solution delivered from an orifice 15 in said tube to break up into droplets just after emerging from said orifice. A preferred construction of the orifice tube is seen at Fig. 4. The tube is preferably made of glass having a low coefficient of expansion, such as the Pyrex glass of commerce, and its outside diameter is preferably of the order of about 7 mm. The length of the outer glass tube 16 is about 6 cm., and the inner glass tubing 17 of about 1 cm. length is fitted snugly inside the outer tube 16. The inner glass tubing is ground square at both ends and is placed flush with the extreme tip of the outer tubing 16. While the outside diameter of the inner tubing 17 is such that it fits snugly inside the outer tubing, it is preferred to heat the outer tubing to redness at one or two points opposite the middle of the inner section to insure its remaining in position. The preferred inside diameter of the inner tubing 17 is about 2 to about 3 mm., as orifices varying within these limits produce nearly the same amount of foam. In standardizing and calibrating several pieces of equipment, we have found that the same amount of foam can be produced in the various units by slightly varying the solution volume in the pipette or reservoir to compensate for slight variations in the diameter of the orifice.

Our pipette or reservoir 12 is preferably furnished with a stocock 18 at the upper part thereof for the purpose of retaining the solution in the pipette or permitting it to be delivered. Behind the receiver 6, there is a linear scale 19 for observing the volume of foam produced. This scale is preferably set off in millimeters and placed so that the zero mark is opposite the point in the receiver which would be reached by the total volume of liquid intended to be introduced from the pipette 12. The volume in the receiver below the zero mark would thus be the sum of the volume of the original pool plus the volume of the delivered solution.

Figure 2:
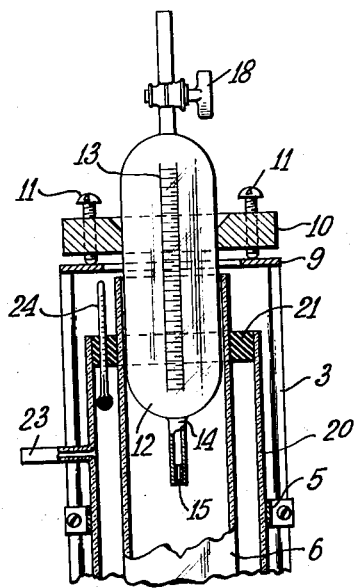
Fig. 2 illustrates a view similar to Fig. 1 of a preferred modification of our novel device.
Figure 2:
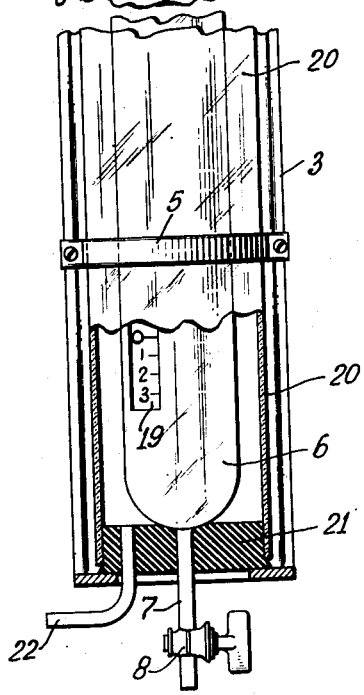

In a preferred modification of our device, illustrated in Fig. 2, we propose to furnish a water jacket 20 for enclosing that part of the receiver 6 in which the foam is formed. The water jacket is of glass so that readings can be taken therethrough and is equipped, top and bottom, with rubber stoppers 21 having required perforations. The water jacket has an inlet 22 and an outlet 23 for use in circulating water at constant temperature through the jacket. The jacket is also equipped with a thermometer 24 for checking the temperature.

The operation of our device is extremely simple. The receiver 6 is adjusted so that it is plumb, and the pipette or reservoir 12, held within the holder 10, is adjusted by means of the three leveling screws 11 so that a liquid emerging from the orifice strikes the bottom center of the receiver. Both the receiver and pipette are thoroughly cleaned in preparation for the test.

The stopcock 8 of the receiver is closed, and 50 cc. of the test solution is run into the receiver by means of a 50 cc. volumetric pipette. This solution is run down the side walls of the receiver to avoid foam formation and to wet the entire interior of the receiver for the purpose of minimizing evaporation. The width of the receiver is preferably such that a pool of solution about 5 cm. deep is formed. The pipette 12 is filled by suction in the usual manner, and preferably to a point which indicates a content of 200 cc. of solution. The pipette or reservoir is then placed in position in the mouth of the receiver, and the pipette stopcock 18 is opened.

When all of the liquid has run out of the reservoir, a stop-watch is started, and readings upon the height of the foam are taken immediately and after a five minute interval. While the first reading is our accepted standard, an additional indication of the relative stability of various foams can be obtained in those cases where breakdown does occur within five minutes. The foam production is measured at the top of the foam column at the highest average height to which the rim of the foam has reached. It will be understood that this height is proportional to the volume of air remaining in the foam.

It will be observed that the device herein described is extremely simple in design and operation and that it is adapted for considerable rapidity in obtaining results. Direct readings of air remaining in the foam in a given solution can be taken therefrom, and foam stability of such solutions can then be empirically evaluated. It will further be observed that the personal equation is practically eliminated from the test, and that the same is essentially free of errors when operating under the standard conditions set forth; thus, extraneous destructive forces and thermal shock are excluded from the system by circulating liquid, e. g. water, of known temperature from a thermostat through the jacket 20 to maintain the liquid under test and the air column at uniform temperature. Evaporation of the foam is also reduced to a minimum, as aforesaid, by previous wetting of the receiver walls with the solution. The pipette or reservoir 12 serves as a stopper for the receiver 6, being loose enough to admit required air and yet tight enough to prevent unhampered diffusion with consequent temperature changes and reduction of the partial pressure of the solution in the atmosphere above the pool. We have found that there is no direct correlation between foam stability, surface tension and liquid density for solutions of different materials. Similarly, when using the dilute solutions of soaps and other detergents for which the test is primarily adapted, no discrepancy due to variations in viscosity of the solution need be considered. We have found that the results obtained over a series of tests upon solutions of various materials have been reproducible to a surprising degree, and the results which we have obtained have enabled us to measure the foaming properties of these solutions.

In the case of soaps, we have found it advisable to observe certain precautions in preparing solutions for our pour foam test. When distilled water at, say 110° F. is used as the solvent, the soap sample is weighed out and added to the required volume of water at 110° F. During the addition, the solution is agitated, preferably mechanically, in such manner as to avoid agglutination of the soap particles, the stirring being continued until all of the soap is dissolved. The soap solution is placed in a water bath at 110° F. and kept there until the solution is ten minutes old, starting from the time when the soap was first added, and the pour test is then run upon the ten minute old solution.

When using hard water at the same temperature as the solvent for the soap, the artificial hard water, such as that prepared from calcium and magnesium salts, is diluted with distilled water to the required degree of hardness, and the pH of the solution is adjusted to within 9.5 to 10.0 by the addition of caustic soda. This pH adjustment is made to avoid soap hydrolysis in the first stages of dissolution. Thereafter, the procedure for preparing the solution is as outlined in the preceding paragraph. Where builders are added to the soaps, the same are mixed with the weighed out sample of dried soap and dissolved as aforesaid.

When using synthetic detergents, it is generally unnecessary to observe the precautions described for preparing soap solutions. Any convenient procedure is normally quite satisfactory, since most of the synthetic detergent materials undergo only slight changes in distilled water. However, in cases where a reaction between the detergent and the solvent or between the detergent and other solute in the solution is suspected, care and control over the temperature and age of the solutions should be exercised.

It will be understood by those skilled in the art that variations and modifications of our process and apparatus may be made, without departing from the principles of the invention herein described. Thus, the amounts and proportions of liquid in the pool at the bottom of the receiving vessel and in the reservoir, as well as the height of the reservoir above the pool and the temperature at which the test is run, are all conditions which may be varied at the discretion of the operator. Furthermore, while we have described our method with reference to employing the same liquid in both the original pool and the reservoir as a preferred embodiment of our invention, those skilled in the art will recognize that two different liquids can be used to provide data upon the foaming properties of one liquid while subjected to the destructive force of impinging droplets of the other. These and other variations and modifications are believed to be within the scope of the present specification and within the purview of the appended claims.

We claim:

1. A method for measuring the foaming properties of liquids which comprises causing a predetermined quantity of a liquid to fall in successive volumetric additions from a predetermined height into a pool of a liquid to be tested having a laterally restricted space thereabove into which any foam formed may rise, and measuring the quantity of said foam in said space after the falling of said predetermined quantity of liquid.

2. A method of measuring the foaming properties of liquids which comprises establishing a pool of a liquid having a laterally restricted space thereabove into which any foam formed may rise, establishing a reservoir of said liquid in predetermined volume, discharging the liquid in the reservoir in successive volumetric additions from a predetermined distance into said pool to form foam, and measuring the quantity of said foam in said space after the discharge of said predetermined volume of liquid.

3. A method for measuring the foaming properties of liquids which comprises establishing a pool of a liquid having a laterally restricted space thereabove, establishing a reservoir of said liquid in predetermined volume, causing the liquid in the reservoir to fall in successive droplets from a predetermined height into said pool whereby foam is formed, and measuring the quantity of said foam in said space after the falling of said predetermined volume of liquid.

4. A method for measuring the foaming properties of liquids which comprises establishing a pool of a liquid to be tested at a predetermined temperature, establishing a reservoir of a liquid in predetermined volume at said temperature, discharging a portion of the liquid in the reservoir from a predetermined height into said pool to form foam, breaking up the discharged liquid into droplets during said discharge, discharging the remainder of the liquid in the reservoir in droplet form into said foam, maintaining said predetermined temperature substantially constant throughout, and measuring the quantity of the foam produced.

5. A method for measuring the foaming properties of a liquid which comprises establishing a pool of said liquid at a predetermined temperature, establishing a reservoir of said liquid in predetermined volume at said temperature at a predetermined height above said pool, discharging a portion of the liquid in the reservoir into said pool, breaking up the discharged liquid into droplets during said discharge to introduce air beneath the surface of the pool, thereby forming a quantity of foam above said pool, discharging the remainder of the liquid in the reservoir in droplet form into said quantity of foam to produce additional foam therein and to destroy part of the foam already produced, maintaining said predetermined temperature substantially constant throughout, and measuring the resulting quantity of foam.

6. A method for measuring the foaming properties of a liquid which comprises establishing a pool of said liquid at a predetermined temperature having an atmosphere thereover substantially saturated with said liquid at said temperature, establishing a reservoir of said liquid in predetermined volume at said temperature at a predetermined height above said pool, discharging a portion of the liquid from the reservoir into said pool, breaking the liquid into droplets during said discharge to produce foam above said pool, discharging the remainder of the liquid in the reservoir in droplet form into said foam to produce additional foam and to destroy part of the foam already produced, maintaining the temperature substantially constant in said liquid and in the atmosphere over the pool throughout, and measuring the quantity of the foam.

7. A method for measuring the relative foam stability of a liquid forming relatively stable foam which comprises establishing a pool of said liquid to be tested of desired volume at a predetermined temperature and having an atmosphere thereover substantially saturated with said liquid at said temperature, establishing a reservoir of a liquid in predetermined volume at said temperature at a predetermined height above said pool, discharging a portion of the liquid from the reservoir into said pool, breaking the discharged liquid into droplets during said discharge to form a column of foam above the pool, discharging the remainder of the liquid in the reservoir in droplet form into said foam to produce additional foam and to destroy part of the foam already produced, maintaining the temperature substantially constant in said liquid and in the atmosphere over the pool throughout, and measuring the height of the resulting column of foam whereby the volume of air in the foam can be calculated.

8. A method for measuring the foaming properties of soap and other detergent solutions which comprises establishing a pool of a solution having a desired concentration of a material selected from the group consisting of soaps and other detergents, controlling the temperature of said solution, providing over said pool an atmosphere substantially saturated with said solution at said temperature, establishing a reservoir of said solution in predetermined volume at said temperature at a predetermined height above said pool, discharging a part of the solution from the reservoir into said pool in droplet form to produce foam, discharging the remainder of the solution in the reservoir in droplet form into said foam to produce additional foam and to destroy part of the foam already produced, maintaining the temperature substantially constant in said solution and in the atmosphere over the pool throughout, and measuring the resulting quantity of foam.

9. A method for measuring the relative foam stability of soap and other detergent solutions which comprises establishing a pool of a solution of desired volume and having a desired concentration of a material selected from the group consisting of soaps and other detergents at a predetermined temperature, said pool having an atmosphere thereover substantially saturated with said solution at said temperature, establishing a reservoir of said solution in predetermined volume at said temperature at a predetermined height above said pool, discharging a portion of the solution from the reservoir into said pool, breaking said solution into droplets during said discharge to form a column of foam above said pool, discharging the remainder of the solution in the reservoir in droplet form into said foam to produce additional foam and to destroy part of the foam already produced, maintaining the temperature substantially constant in said solution and in the atmosphere over the pool throughout, and measuring the height of the resulting column of foam whereby the volume of air in the foam can be calculated.

10. A device for measuring the foaming properties of liquids which comprises a vertical receiving vessel having a mouth at the upper end thereof, means for positioning a reservoir in the mouth of said receiving vessel at a predetermined height above the lower end of said vessel, a reservoir adapted to be held by said positioning means and adapted for releasably retaining a predetermined amount of liquid, means for releasing said liquid to discharge the liquid into the receiving vessel, and an outlet orifice at the lower end of said reservoir constructed for setting up turbulence in liquid delivered therefrom and breaking up a stream of said liquid into droplets after its emergence whereby liquid discharged from said reservoir into a pool in said receiving vessel can introduce air beneath the surface of said pool to form a measurable column of foam thereabove, thereby providing data for calculating the volume of air in the foam column.

11. A device for measuring the foaming properties of liquids which comprises a vertical, substantially transparent receiving vessel having a mouth at the upper end thereof; means for positioning a reservoir in the mouth of said receiving vessel at a predetermined height above the lower end of said vessel; a reservoir of outside diameter only slightly smaller than the inside diameter of the mouth of said receiving vessel, adapted to be held by said positioning means and adapted for releasably retaining a predetermined amount of liquid; means for releasing said liquid to discharge liquid into the receiving vessel; an outlet orifice at the lower end of said reservoir adapted for breaking liquid discharged therefrom into droplets; and means for regulating and maintaining a substantially constant predetermined temperature in the receiving vessel and reservoir.

12. A device for measuring the foaming properties of liquids which comprises a frame; a vertical, cylindrical, substantially transparent receiving vessel attached to said frame and having a mouth at the upper end thereof; supporting means attached to said frame above the mouth of the receiving vessel and adapted to hold a container extending into the mouth of said receiving vessel; a container having an outside diameter only slightly smaller than the inside diameter of said receiving vessel, adapted for being held by said supporting means and for releasably retaining a predetermined quantity of liquid and having a stopcock at the upper portion thereof for releasing said liquid and an outlet orifice at the lower portion thereof whereby said liquid can be broken up into droplets during discharge therefrom; means for regulating and maintaining a substantially constant predetermined temperature in the receiving vessel and the container whereby liquid discharged from said container into a pool in said receiving vessel can introduce air beneath the surface of said pool to form foam; and means for measuring the resulting column of foam.

13. A device for measuring the relative foam stability of liquids forming relatively stable foams which comprises a frame; a vertical, cylindrical, substantially transparent receiving vessel attached to said frame and having a mouth at the upper end thereof; supporting means attached to said frame above the mouth of the receiving vessel and adapted to hold a pipette extending into the mouth of said receiving vessel; a pipette having an outside diameter only slightly smaller than the inside diameter of said receiving vessel, adapted for being held by said supporting means and for releasably retaining a predetermined quantity of liquid and having a stopcock at the upper portion thereof for releasing said liquid and an outlet orifice at the lower portion thereof adapted for setting up turbulence in liquid discharged therefrom and for breaking up said liquid into droplets during such discharge; means for regulating and maintaining a substantially constant predetermined temperature in the receiving vessel and the pipette whereby liquid discharged from said pipette into a pool of known volume in said receiving vessel can introduce air beneath the surface of said pool to form a measurable column of foam thereupon; and means for measuring the height of said column of foam thereby providing data for calculating the volume of air in the foam column.

JOHN ROSS.
GILBERT DE WAYNE MILES.